United States Patent
Aharon et al.

(10) Patent No.: US 7,519,220 B2
(45) Date of Patent: Apr. 14, 2009

(54) GPU ACCELERATED ISOPERIMETRIC ALGORITHM FOR IMAGE SEGMENTATION, DIGITAL PHOTO AND VIDEO EDITING

(75) Inventors: Shmuel Aharon, West Windsor, NJ (US); Leo Grady, Yardley, PA (US); Thomas Schiwietz, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 512 days.

(21) Appl. No.: 11/273,511

(22) Filed: Nov. 14, 2005

(65) Prior Publication Data

US 2006/0104510 A1 May 18, 2006

Related U.S. Application Data

(60) Provisional application No. 60/627,978, filed on Nov. 15, 2004.

(51) Int. Cl.
*G06K 9/34* (2006.01)
(52) U.S. Cl. ........................................ 382/173
(58) Field of Classification Search .................. None
See application file for complete search history.

(56) References Cited

U.S. PATENT DOCUMENTS

| | | | | |
|---|---|---|---|---|
| 6,000,597 | A * | 12/1999 | Straub et al. | 228/33 |
| 6,154,216 | A * | 11/2000 | Walton | 345/619 |
| 6,249,595 | B1 * | 6/2001 | Foxall et al. | 382/128 |
| 6,594,381 | B2 * | 7/2003 | Tsap et al. | 382/154 |
| 6,718,063 | B1 * | 4/2004 | Lennon et al. | 382/224 |
| 6,744,923 | B1 * | 6/2004 | Zabih et al. | 382/226 |
| 7,295,700 | B2 * | 11/2007 | Schiller et al. | 382/159 |
| 2004/0008886 | A1 * | 1/2004 | Boykov | 382/173 |
| 2004/0086185 | A1 * | 5/2004 | Sun | 382/224 |
| 2004/0156544 | A1 * | 8/2004 | Kajihara | 382/167 |

OTHER PUBLICATIONS

"Perceptible level lines and isoperimetric ratio", Froment, J., PRISME, Univ. Rene Descartes, Paris; Image Processing, Proceedings. 2000 International Conference on, 2000.*

"Multi-label Image Segmentation for Medical Applications Based on Graph-Theoretic Electrical Potentials", Leo Grady and Gareth Funka-Lea, CVAMIA-MMBIA 2004, LNCS 3117, pp. 230-245, May 15, 2004.*

Bolz, Jeff, et al., "Sparse matrix Solvers on the GPU: Conjugate Gradients and Multigrid", *ACM Transaction on Graphics, 22*(3); *Special issue: Proceedings of ACM Siggraph*, Available at http://www.multires.caltech.edu/pubs/GPUSim.pdf, last accessed on Nov. 8, 2005, (Jul. 2003), 917-924.

(Continued)

*Primary Examiner*—Matthew C Bella
*Assistant Examiner*—Yuzhen Ge
(74) *Attorney, Agent, or Firm*—Donald B. Paschburg

(57) ABSTRACT

A system and method for segmenting an object in an image using an isoperimetric ratio in a graphics processing unit is disclosed. The object is identified by one or more selected pixels located within the object. The system includes a graphics processing unit and software loadable on the graphics processing unit. The software is operable to find weights for edges, to build a Laplacian matrix and a d vector, to eliminate the row and column corresponding to the one or more selected pixels to determine $L_0$ and $d_0$, to solve $x_0$ in the equation $L_0 x_0 = d_0$; and to threshold the potentials x at the value that selects the object having the lowest isoperimetric ratio.

20 Claims, 4 Drawing Sheets

OTHER PUBLICATIONS

Grady, Leo, et al., "Isoperimetric Graph Partitioning for Data Clustering and Image Segmentation", Available at http://www.math.ucdavis.edu/~saito/data/high-dimensions/grady2003isoperimetric-TR.pdf, last accessed on Nov. 8, 2005,(Jul. 29, 2003), 1-39.

Grady, Leo J., "Space-Variant Computer Vision: A Graph-Theoretic Approach.", Submitted in partial fulfillment of the requirements for the degree of Doctor of Philosophy; Boston University, Graduate School of Arts and Sciences.,(2004), 1-159.

Kruger, Jens, et al., "Linear Algebra Operators for GPU Implementation of Numerical Algorithms", *ACM Transactions on Graphics 22(3); Special issue: Proceedings of ACM Siggraph*, Available at http://wwwcg.in.tum.de/Research/data/Publications/sig03.pdf, last accessed on Nov. 8, 2005,(Jul. 2003), 908-916.

Lefohn, Aaron E., et al., "Interactive Deformation and Visualization of Level Set Surfaces Using Graphics Hardware", *IEEE Visualization*, Available at http://www.sci.utah.edu/~lefohn/work/rls/visLevelSet/visLevelSetPaper.pdf, last accessed on Nov. 8, 2005,(2003),75-82.

Lefohn, Aaron E., et al., "Interactive, GPU-Based Level Sets for 3D Segmentation", *Medical Image Computing and Computer Assisted Intervention (Miccai)*, Available at http://graphics.cs.ucdavis.edu/~lefohn/work/rls/tumorSeg/, last accessed on Nov. 8, 2005,(2003), 564-572.

\* cited by examiner

GPU ACCELERATED ISOPERIMETRIC ALGORITHM FOR IMAGE SEGMENTATION, DIGITAL PHOTO AND VIDEO EDITING

CROSS-REFERENCE TO RELATED APPLICATIONS

This application claims the benefit of U.S. Provisional Application No. 60/627,978, filed Nov. 15, 2004, which is incorporated herein by reference.

BACKGROUND OF THE INVENTION

The present invention relates to the editing of digital still photographs and of video images.

Digital photography is very popular and there are many digital images—both still and video—being generated. Photographers, including members of the general public, are very interested in being able to edit the digital images being generated. The editing involves many different operations. For example, many users want to crop one object from a first picture and crop another object from a second picture and add these objects to a new picture, such as a collage. This function, as well as other editing functions, require the identification of structures or objects within an image.

Tools are available that allow editing of this nature to take place. For example, digital image editing tools available today provide such editing tools. Photoshop, one of the readily available editing tools, provides a Magic Wand tool and an Intelligent Scissors tool, each of which allow a user to attempt to crop an object from an image. In the Magic Wand tool, the user clicks on a point and Photoshop attempts to isolate or segment the object. Often times, several attempts are needed to successfully segment the selected object. In the Intelligent Scissors tool, the user clicks on the boundary. Both of these tools are problematic and time consuming to use, and create frustration on the part of the users.

Manufacturers of digital cameras are also providing software tools with their cameras that provide some editing capabilities. These software tools, in some cases allow the cropping of objects from images, and therefore segment objects. However, they also provide limited capabilities. They are also slow and problematic in their use.

Thus, new and improved method and systems to segment selected objects in digital images (still and video), and to provide quicker segmentation of the selected objects, are needed.

SUMMARY OF THE INVENTION

The present invention provides a method and system for segmenting objects in a picture using an isoperimetric ratio. The isoperimetric ratio is preferably determined in a graphics processing unit in accordance with one aspect of the present invention.

In accordance with one aspect of the present invention, a system for segmenting an object in an image is presented. The object is identified by one or more selected pixels located within the object. The system includes a graphics processing unit and software loadable on the graphics processing unit. The software is operable to determine weights for all edges of neighboring pixels for the image; build a Laplacian matrix L with the weights; determine a vector d having values associated with a pixel equal to a sum of the weights of the neighbors of that pixel; eliminate the row and column corresponding to the one or more selected pixels from the Laplacian matrix L and the vector d to determine $L_0$ and $d_0$; solve x in the equation $L_0 x = d_0$; and threshold the potentials x to determine a family of segmentations and select one of the segmentations having a minimum isoperimetric ratio as the object. The software is further operable to segment the object from the image.

The edge weights are preferably a function of the difference between an intensity at a first pixel and the intensity at a second pixel. In accordance with one aspect of the present invention, the edge weights are equal to $w_{ij} = \exp(-\beta(I_i - I_j)^2)$ where $\beta$ is a constant and I is an intensity value. When a color photo is taken other weighting functions can be used. For example, $w_{ij} = \exp(-\beta \|C_i - C_j\|^2)$ where $w_{ij}$ represents the weight between nodes $v_i$ and $v_j$, $\beta$ is a free parameter, $C_i$ is the vector of color values at node $v_i$ and $C_j$ is the vector of color values at node $v_j$ can be used. A preferred value of $\beta$ is 900, although other values can be used.

In accordance with a further aspect of the present invention, a golden section search algorithm is used to find the object to be segmented from a subset of the family of segmentations. This minimizes processing time.

In accordance with another aspect of the present invention, the one or more selected pixels that identify the object to be segmented are input into a Z buffer in the graphics processing unit such that the one or more selected pixels are excluded from processing.

In accordance with another aspect of the present invention, a system includes a graphics processing unit and software loadable on the graphics processing unit, the software being operable to for each of a plurality of possible objects that include the one or more selected pixels, determine a isoperimetric ratio equal to a perimeter of the possible object divided by the volume of the possible object. The software further selects the object from the plurality of possible objects in accordance with the isoperimetric ratio.

DESCRIPTION OF A PREFERRED EMBODIMENT

Figure 1:
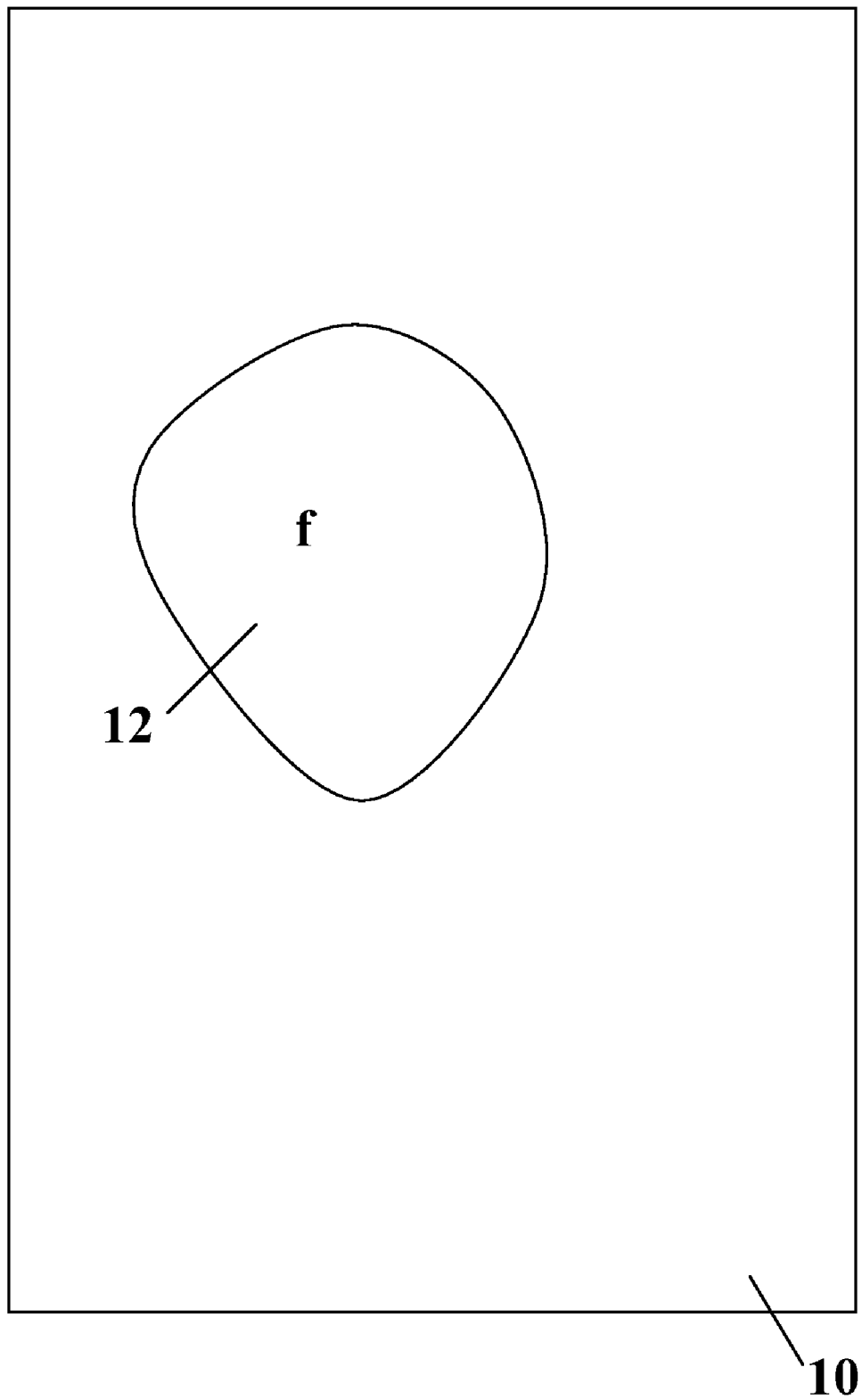
FIG. 1 illustrates an object in an image that is to be segmented.

Referring to FIG. 1, The present invention segments an image region 12 or an object 12 in an image 10 by marking one or more pixels as foreground and allowing a process determine the foreground/background boundary of the object. In FIG. 1, the marked pixel is designated as "f". The marked pixels are located within the image region or object being segmented. In accordance with one aspect of the present invention, this task is accomplished by applying an isoperimetric algorithm. The isoperimetric algorithm produces high quality segmentations, comparable in quality to prevalent spectral methods, but with improved speed and stability. A graphics processing unit (GPU) accelerated version of the process with significant speed improvements is described herein.

The isoperimetric algorithm has been described as an automatic (i.e., unsupervised) image segmentation process. Although the process can be a randomized scheme for choosing foreground points, the structure of the process allows it to be applied as an interactive program where the user supplies a foreground pixel (or more) and the algorithm partitions the image into foreground and background. The computational hurdle of the isoperimetric algorithm is in the solution to a large, sparse, system of linear equations. A GPU implementation is preferred since the solution to such a system may be efficiently parallelized in the GPU.

A segmentation algorithm that is based on seeded region growing has been described. The merging criterion is based on intensity and gradient values, where the gradient sensitivity is scaled using nonlinear diffusion. However, region-growing algorithms are notorious for "leaking" the segmented region through a weak boundary. In contrast, the isoperimetric algorithm of the present invention gracefully handles weak object boundaries, as shown by its ability to correctly segment the "Kaniza triangle" illusion from psychology in which no edge information is present. The multi-label random walker algorithm described in U.S. Provisional Patent Application Ser. No. 60/628,035, filed Nov. 15, 2004, also correctly handles weak boundaries. From a user standpoint, the major difference between the random walker algorithm and the isoperimetric algorithm is that the random walker algorithm requires specification of foreground and background seeds, while the isoperimetric algorithm only requires specification of foreground seeds. However, it should be noted that these algorithms are fundamentally different from each other and may produce different segmentations on the same image.

It has been suggested to use a GPU based segmentation using thresholding followed by morphological operations to smooth the object boundaries and remove spurious pixels. This method can only be effective when the pixel intensities are clearly above or below the threshold. However, real images are rarely so simple. Furthermore, thresholding is quite sensitive to image noise. See, for example, Ruigang Yang and Greg Welch. Fast image segmentation and smoothing using commodity graphics hardware. Journal of Graphics Tools, 7(4):91-100, 2002;

Lefohn used deformable iso-surfaces implemented with level-set methods. The solution and visualization of the level-set equations is performed entirely on the GPU. See, for example, A. E. Lefohn, J. E. Cates, R. T. Whitaker, "Interactive, GPU-Based Level Sets for 3D Segmentation," Medical Image Computing and Computer Assisted Intervention (Miccai), pp. 564-572, 2003 and A. E. Lefohn, J. M. Kniss, C. D. Hansen, R. T. Whitaker, "Interactive Deformation and Visualization of Level Set Surfaces Using Graphics Hardware," IEEE Visualization, pp. 7582, 2003. Since level-set methods achieve local energy minima instead of a global minimum, a contour that is not initialized close to the actual contour will fail to find the appropriate object boundary. Additionally, since level set methods find local energy minima, and because of their precise formulation only in the continuum (as opposed to a lattice), it is more difficult to make theoretical predications about the actual performance of the algorithm. Finally, level set methods frequently involve several free parameters, while the isoperimetric algorithm requires the setting of only a single free parameter.

Today there are various publications introducing ways to solve linear systems and perform linear algebra operations on the GPU. See, for example Bolz, J.; Farmer, I.; Grinspun, E.; Schrooder, P. Sparse matrix solvers on the GPU: conjugate gradients and multigrid. ACM Transactions on Graphics; Volume 22, Issue 3 (July 2003); Special issue: Proceedings of ACM SIGGRAPH 2003; Pages: 917-924; Jens Krüger; Rüdiger Westermann; Linear algebra operators for GPU implementation of numerical algorithms; ACM Transactions on Graphics; Volume 22, Issue 3 (July 2003); Special issue: Proceedings of ACM SIGGRAPH 2003; p. 908-916; Ádám Moravánszk; Dense Matrix Algebra on the GPU, in ShaderX2: Shader Programming Tips & Tricks with DirectX 9; Engel, W.; Wordware Publishing; 2003; p. 352-381. 352 (29) and Chris J. Thompson; Sahngyun Hahn; Mark Oskin. Using modern graphics architectures for general-purpose computing: a framework and analysis; Proceedings of the 35th annual ACM/IEEE international symposium on Microarchitecture; Istanbul, Turkey; 2002; Pages: 306-317. All of these publications exploit special features of the GPU. For example, one may utilize fragment shaders (programs) to operate on floating point textures in an SIMD manner. It is widely suggested in the literature that one take advantage of the GPU capability to perform in a single instruction the same operation on 4 floating point values packed into an RGBA texel (texture element). A different approach that assigns four different vectors into the RGBA texture elements is used here. This approach allows us to skip the packing/unpacking steps of the data and therefore the early Z-test can be applied to improve performance. Furthermore, several vectors may be processed in one rendering pass, hence accelerating the calculation. Also, the sparse matrix is maintained as a texture in a different scheme. See, for example, U.S. patent application Ser. No. 11/098,676, filed Apr. 4, 2005, which is hereby incorporated by reference herein. In the present approach, entire system is built on the GPU. This approach limits the data transfer between the CPU and the GPU with the consequence of increased speed.

Figure 2:
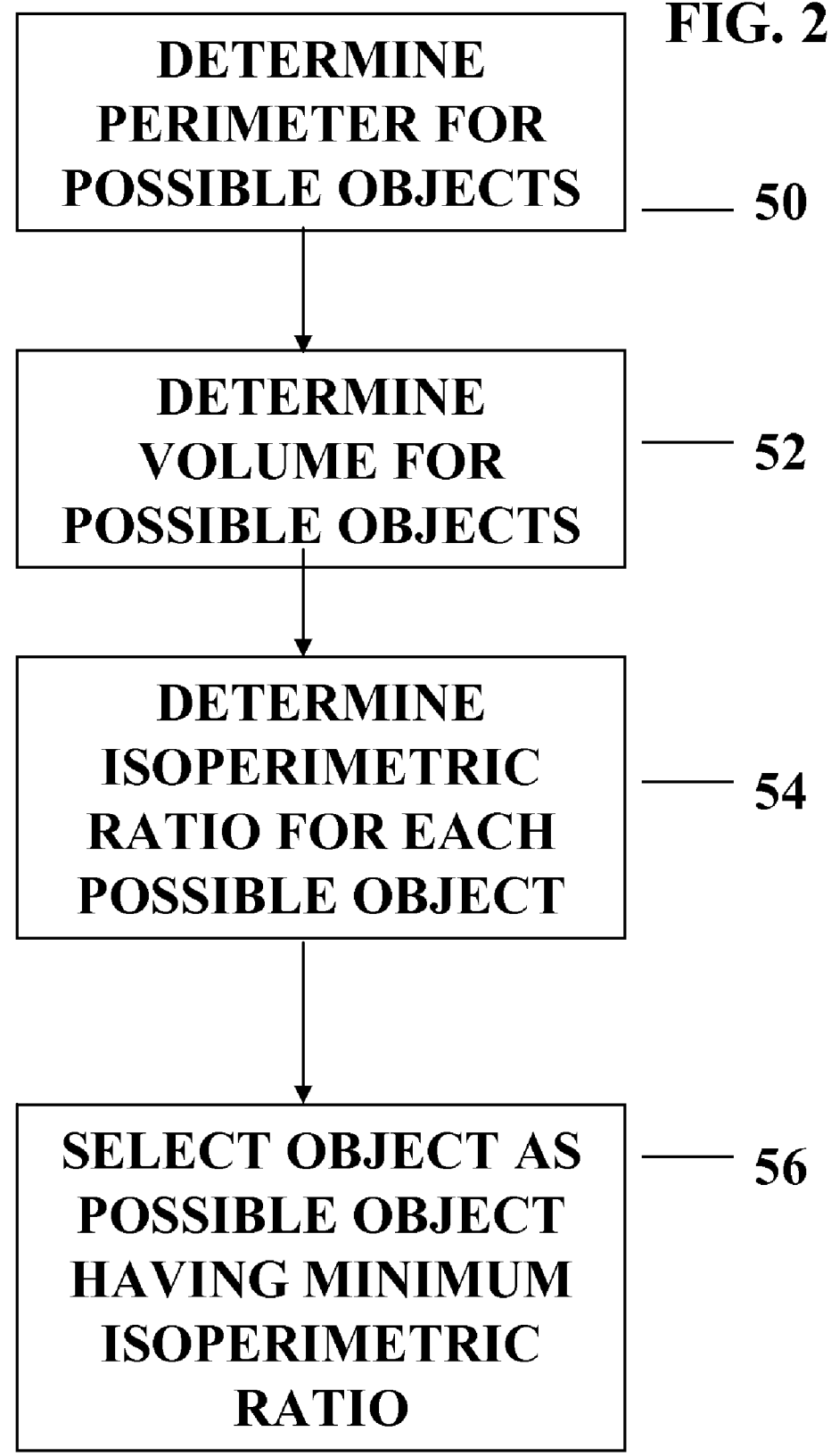
FIG. 2 illustrates the steps in accordance with one aspect of the present invention.

FIG. 2 illustrates one aspect of the isoperimetric problem. In step 50, the perimeter for all possible objects identified by the marked pixel or pixels f is determined. Then, in step 52, the volume for those objects is determined. The isoperimetric ratio, the perimeter divided by the volume of each possible object is determined in step 54. Then, in step 56, the object 12 is selected as being the object having the minimum isoperimetric ratio.

The main computational hurdle in the isoperimetric algorithm is the solution of a large, sparse, symmetric, positive definite, system of equations. Fortunately, the sparsity pattern of the matrix is highly structured such that the row corresponding to any one node in the lattice only contains one non-zero for each of its neighboring nodes. Consequently, one need not store the matrix explicitly, only the values of the non-zeros. The solution to the system of equations is converted into a segmentation by finding a threshold on the solution (by checking the N thresholds corresponding to each pixel) that corresponds to a partition with the smallest isoperimetric ratio, as described below.

The image data, the marked/unmarked voxels, the systems matrix, the right hand side vector and the solution vector, are all represented on the GPU as floating-point textures. We then perform the calculations by rendering a rectangle primitive into the resulting floating-point texture, providing the relevant vectors and matrices as input textures, and performing the calculation in a fragment program. By using different textures as input/output and loading different fragment programs we can control the flow of the calculation.

Noticing that marked voxels have to be kept zero in all textures used for the solution of the linear system of equations, the Z-buffer in a graphics processing unit is used to mask out all the marked voxels. The early-Z test discards a masked voxel before entering the pixel pipeline and thus saving rendering time. There is no longer a need to keep the marked/unmarked voxel information on the GPU, which reduces the memory footprint of our algorithm.

The final step is to find the threshold value that corresponds to the partition with the smallest isoperimetric ratio. This step is performed on the GPU using a modified golden section search algorithm, such as is described in W. H. Press, S. A. Teukolsky, W. T. Vettenling, B. P. Flannery. Numerical Recipes in C, Second Edition, Cambridge University Press. Using the GPU RGBA texture elements, four isoperimetric ratios can be calculated in parallel. Four intermediate threshold values equally spread across the entire range of the solution are evaluated. A new smaller bracketing interval is defined containing the threshold value with the minimal isoperimetric ratio and its two intermediate neighbors. The process continues until a small enough bracketing interval is found.

An extension to 3D is straight-forward. A stack of 2D slices is used to represent the volume. Since the matrix is stored as a texture it can store four weights only but six are needed in space. The missing two components are sampled from neighboring matrix entries accordingly.

A solution of isoperimetric problem applied to segmenting objects in images in accordance with a preferred embodiment of the present invention will now be discussed. Graph partitioning has been strongly influenced by properties of a combinatorial formulation of the classic isoperimetric problem: For a fixed area, find the region with minimum perimeter. The isoperimetric constant h of a manifold is defined as Eq. 1

$$h = \inf_S \frac{|\partial s|}{Vol_s} \quad \text{Eq. [1]}$$

where S is a region in the manifold, $Vol_s$ denotes the volume of region S, $|\partial s|$ is the area of the boundary of region S, and h is the infimum of the ratio over all possible S. For a compact manifold, $Vol_s \leq \frac{1}{2} Vol_{Total}$, and for a noncompact manifold, $Vol_s < \infty$.

It can be shown that the set (and its complement) for which h takes a minimum value defines a good heuristic for image segmentation. In other words, finding a region of an image that is both large (i.e., high volume) and that shares a small perimeter with its surroundings (i.e., small boundary) is intuitively appealing as a "good" image segment.

Previous applications of graph partitioning to image segmentation have yielded successful algorithms. In general, previous approaches have been based on spectral graph theory and on max-flow/min cut methods. Although the isoperimetric criterion is intuitively similar to the partitioning criterion used in the spectral graph theory, the seemingly slight difference in formulation allows solution by a system of linear equations rather than an eigenvector problem. A system of linear equations is desirable because it improves both speed and stability. Furthermore, there are situations for which spectral approaches have degenerate solutions. The minimum-cut approaches to segmentation tend to produce small partitions or to require a large number of (generally user-specified) sinks/sources. The isoperimetric algorithm favors larger partitions, and thus avoids this problem.

An isoperimetric partitioning process in accordance with one aspect of the present invention is now described. A graph is a pair G=(V, E) with vertices (nodes) v∈V and edges e∈ ⊆V×V. An edge, e, spanning two vertices, $v_i$ and $v_j$, is denoted by $e_{ij}$. Let n=|V| and m=|E| where |•| denotes cardinality. A weighted graph has a value (typically nonnegative and real) assigned to each edge called a weight. The weight of edge is denoted by $w(e_{ij})$ or $w_{ij}$. Since weighted graphs are more general than unweighted graphs (i.e., $w(e_{ij})$=1 for all $e_{ij}$∈E in the unweighted case), we will develop all our results for weighted graphs. The degree of a vertex $v_i$, denoted $d_i$, is $$d_i = \sum_{e_{ij}} w(e_{ij}) \forall\, e_{ij} \in E.$$

The vector d is a vector with one value per pixel, the value being the sum of the weights of the neighbors of that pixel.

For a graph, G, the isoperimetric constant, $h_G$ is:

$$h = \inf_S \frac{|\partial s|}{Vol_s} \quad \text{Eq. [1]}$$

where S ⊂ V and $Vol_s < \frac{1}{2} Vol_v$. In graphs with a finite node set, the infimum in (2) is a minimum. Since the present context is that of finite graphs, we will henceforth use the minimum in place of the infimum. The boundary of a set, S, is defined as $\partial S = e_{ij} | x_i \in S, v_j \in \overline{S}$, and $$|\partial S| = \sum_{e_{ij} \in \partial S} w(e_{ij})$$

In order to determine a notion of volume for a graph, a metric must be defined. Different choices of a metric lead to different definitions of volume and even different definitions of a combinatorial Laplacian operator. It has been suggested to use two different notions of combinatorial volume, $$Vol_S = |S| \quad \text{(Eq. 4)}$$

and $$Vol_S = \sum_i d_i \forall\, v_i \in S \quad \text{(Eq. 5)}$$

One may view the difference between the definition of volume in (Eq. 4) and that in (Eq. 5) as the difference between what has been termed "Average Cut" versus the "Normalized Cut", although the isoperimetric ratio (with either definition of volume) corresponds to neither criterion. Traditional spectral partitioning employs the same algorithm as Ncuts, except that it uses the combinatorial Laplacian defined by the metric associated with (Eq. 4). It has been found that that the second metric (and hence, volume definition) is more suited to image segmentation since regions of uniform intensity are given preference over regions that simply possess a large number of pixels. Therefore, we will use Dodziuk's second metric definition and employ volume as defined in A. E. Lefohn, J. M. Kniss, C. D. Hansen, R. T. Whitaker, "Interactive Deformation and Visualization of Level Set Surfaces Using Graphics Hardware," IEEE Visualization, pp. 7582, 2003.

For a given set, S, we term the ratio of its boundary to its volume the isoperimetric ratio, denoted by h(S). The isoperimetric sets for a graph, G, are any sets S and for which $h(S)=h_G$ (note that the isoperimetric sets may not be unique for a given graph). The specification of a set satisfying the volume constraint, together with its complement may be considered as a partition and therefore the term is used interchangeably with the specification of a set satisfying the volume constraint. A good partition is considered to be one with a low isoperimetric ratio (i.e., the optimal partition is represented by the isoperimetric sets themselves). Therefore, the goal is to maximize $Vol_S$ while minimizing $\partial S$. Unfortunately, finding isoperimetric sets is an NP-hard problem. The process of this invention may be considered to be a heuristic for finding a set with a low isoperimetric ratio that runs in low-order polynomial time.

The isoperimetric algorithm in accordance with a preferred embodiment of the present invention is now described. Define an indicator vector, x, that takes a binary value at each node $$x_i = \begin{cases} 0 & \text{if } v_i \in \bar{S} \\ 1 & \text{if } v_i \in S \end{cases}$$

Note that a specification of x may be considered a partition.

Define the n×n matrix, L, of a graph as $$L_{v_i v_j} = \begin{cases} d_i & \text{if } i = j \\ -w(e_{ij}) & \text{if } e_{ij} \in E \\ 0 & \text{otherwise} \end{cases}$$

The notation is used to indicate that the matrix L is being indexed by vertices vi, and vj. This matrix is also known as the admittance matrix in the context of circuit theory or the Laplacian matrix in the context of finite difference methods (and in the context of [9]). By definition of L, $$|\partial S| = x^T L x \qquad \text{Eq. 8}$$

and $Vol_S = x^T d$, where d is the vector of node degrees. If r indicates the vector of all ones, minimizing Eq. 8 subject to the constraint that the set, S, has fixed volume may be accomplished by asserting $$Vol_S = x^T d = k \qquad \text{Eq. 9}$$

where $0 < k < \frac{1}{2} r^T d$ is an arbitrary constant and r represents the vector of all ones. We shall see that the choice of k becomes irrelevant to the final formulation. Thus, the isoperimetric constant (2) of a graph, G, may be rewritten in terms of the indicator vector as $$h_G = \min_x \ (x^T L x)/x^T d \qquad \text{Eq. 10}$$

subject to the constraint of (9). Given an indicator vector, x, h(x) represents the isoperimetric ratio associated with the partition specified by x. Note that the ratio given by (10) is different from both the "ratio cut" and the "average cut" of other techniques. Although the criterion in (10) rewards qualitatively similar partitions to the normalized cut, average cut and ratio cut (i.e., large segments with small boundaries), what appears as a minor difference in the formulation allows us to use a solution to a system of linear equations instead of solving an eigenvector problem. The advantages of solving a system of linear equations, rather than an eigenvector problem, will be discussed below.

The constrained optimization of the isoperimetric ratio is made into a free variation via the introduction of a Lagrange multiplier $\Lambda$ and relaxation of the binary definition of x to take nonnegative real values by minimizing the cost function $$Q(x) = x^T L x - \Lambda(x^T d - k). \qquad \text{(Eq. 11)}$$

Since L is positive semi-definite and $x^T d$ is nonnegative, Q(x) will be at a minimum for any critical point. Differentiating Q(x) with respect to x and setting to a minimum yields $$2Lx = \Lambda d \qquad \text{(Eq. 12)}$$

Thus, the problem of finding the x that minimizes Q(x) (minimal partition) reduces to solving a linear system. Henceforth, the scalar multiplier 2 and the scalar $\Lambda$ are dropped, since only the relative values of the solution are significant.

Unfortunately, the matrix L is singular: all rows and columns sum to zero (i.e., the vector r spans its nulispace), so finding a unique solution to (Eq 12) requires an additional constraint.

Assume that the graph is connected, since the optimal partitions are clearly each connected component if the graph is disconnected (i.e., h(x)=0). Note that in general, a graph with c connected components will correspond to a matrix L with rank (n−c). If a selected node, Vg, is defined to include in S (i.e., fix $x_g = 0$), this is reflected in (12) by removing the gth row and column of L, denoted by $L_0$, and the gth row of x and d, denoted by $x_0$ and $d_0$, such that $$L_0 x_0 = d_0 \qquad \text{Eq. 13}$$

which is a nonsingular system of equations.

Solving Eq 13 for $x_0$ yields a real-valued solution that may be converted into a partition by setting a threshold. It has been shown that the partition containing the node corresponding to the removed row and column of L must be connected, for any chosen threshold i.e., the nodes corresponding to x0 values less than the chosen threshold form a connected component.

There is a physical analogy to this system and process. Equation (12) occurs in circuit theory when solving for the electrical potentials of an ungrounded circuit in the presence of current sources. After grounding a node in the circuit (i.e., fixing its potential to zero), determination of the remaining potentials requires a solution of (13). Therefore, we refer to the node, $v_g$, for which we set $X_g = 0$ as the ground node. Likewise, the solution, x, obtained from (13) at node v, will be referred to as the potential for node v. The need for fixing $X_g = 0$ to constrain (12) may be seen not only from the necessity of grounding a circuit powered only by current sources in order to find unique potentials, but also from the need to provide a boundary condition in order to find a solution to Poisson's equation, of which (12) is a combinatorial analog. In the present case, the "boundary condition" is that the grounded node is fixed to zero. With this interpretation of the notation used above, the three fundamental equations of circuit theory (Kirchhoff's current and voltage laws and Ohm's law) may be written for a grounded circuit as $$A_0^T y = f \text{ (Kirchhoff's Current Law)} \qquad \text{(Eq 14)}$$

$$Cp = y \text{ (Ohm's Law)} \qquad \text{(Eq 15)}$$

$$p = A_0 x \text{ (Kirchhoff's Voltage Law)} \qquad \text{(Eq 16)}$$

for a vector of branch currents, y, current sources, f, and potential drops (voltages), p. Note that there are no voltage sources present in this formulation. These three equations may be combined into the linear system $$A_0^T C A_0 x = L_0 x = f \qquad \text{(Eq. 17)}$$

since $A^T C A = L$.

There is a deep connection between electric circuits and random walks on graphs, which suggests the analysis of this algorithm in terms of a random walk on a graph. The electric potential calculated above for each node admits interpretation as the expected number of steps a random walker starting from that node would take in order to reach the ground, if his probability of walking from node $v_i$ to $v_j$ is equal to $w_{ij}/d_i$. In this interpretation, the threshold is in units of expected steps of a random walker to ground, chosen to partition the graph into subsets possessing the smallest isoperimetric ratio for justification of this interpretation).

Figure 3:
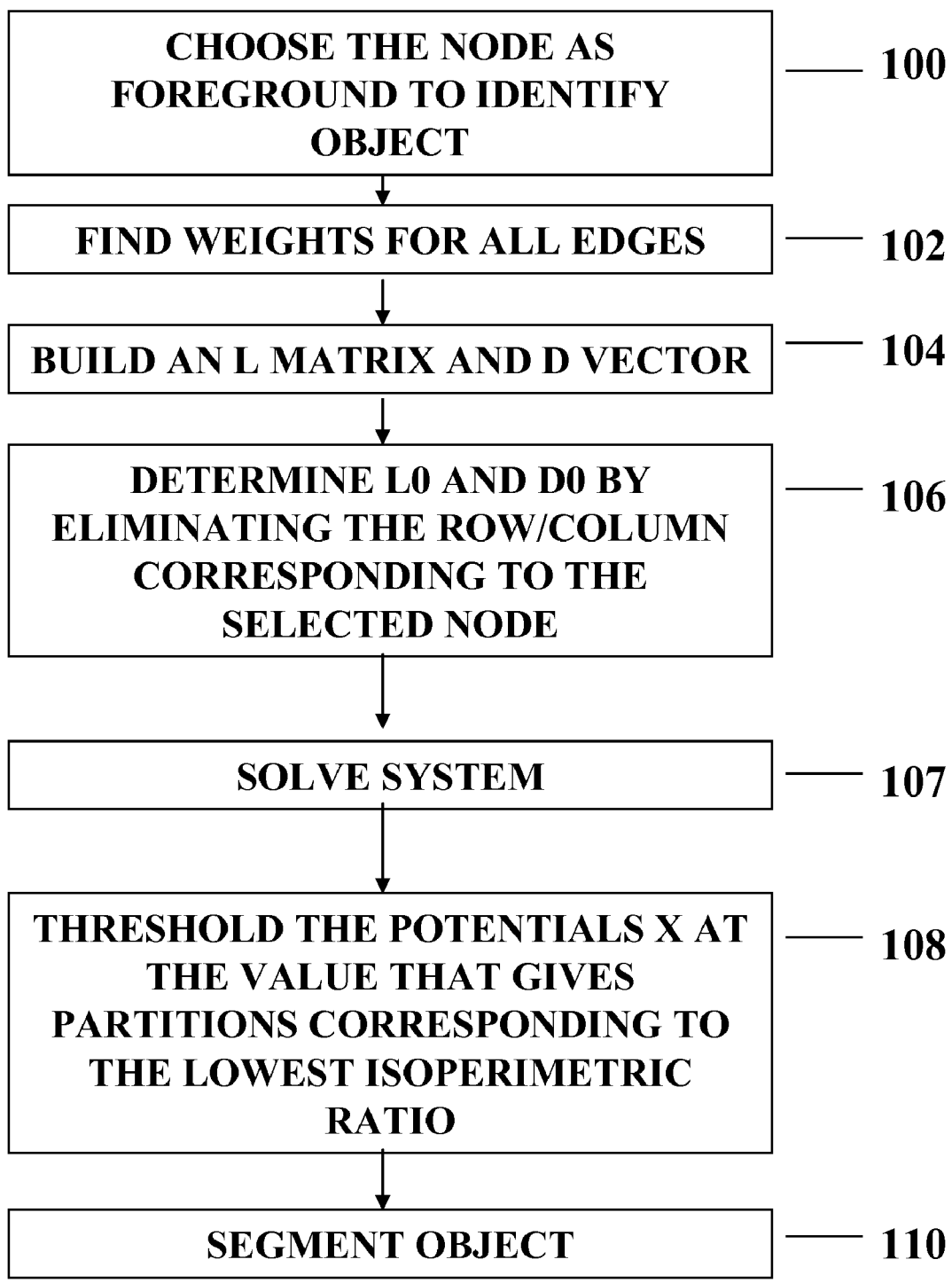
FIG. 3 illustrates the steps in accordance with another aspect of the present invention.

The process of the present invention in accordance with a preferred embodiment is illustrated in FIG. 3. In step 100, one or more pixels are selected as a foreground node, such as f in FIG. 1. In step 102, find weights for all edges using (Eq 18). In step 104 build an L matrix and a d vector. In step 106 determine $L_0$ and $d_0$ by eliminating the row/column corresponding to the selected one or more pixels. In step 107, the system is solved. In step 108, solve (13) for $x_0$ and threshold the potentials x at the value that gives partitions corresponding to the lowest isoperimetric ratio. In step 110, the object (or partition) is segmented. Then further image processing can be performed on the segmented object or on the new image.

In order to apply the isoperimetric algorithm to partition a graph, the image values must be encoded on the graph via edge weights. The preferred edge weights depend on the image being processed. The following standard weighting function is preferred for most situations, although others can be used.

$$w_{ij} = \exp(-\beta(I_i - I_j)^2) \quad \text{Eq 18}$$

where $\beta$ represents a free parameter and I indicates the intensity value at node v. Note that $(Ii-Ij)^2$ may be replaced by the squared norm of a Euclidean distance in the case of vector valued data. In order to make one choice of $\beta$ applicable to a wide range of data sets, it is helpful to normalize the intensity differences for an image before applying Eq. 18. Othe weighting coefficients can be used.

Partitions must be selected from the solution. This is preferably accomplished as follows: The binary definition of x was extended to the real numbers in order to solve (13). Therefore, in order to convert the solution, x, to a partition, a subsequent step must be applied (as with spectral partitioning). Conversion of a potential vector to a partition may be accomplished using a threshold. A cut value is a value, a, such that $S=\{v_i|x_i \leq \alpha\}$ and $\overline{S}=\{v_i|x_i > \alpha\}$. The partitioning of S and $\overline{S}$ in this way may be referred to as a cut. This thresholding operation creates a partition from the potential vector, x. Note that since a connected graph corresponds to an $L_0$ that is an M-matrix, and is therefore monotone, $L_0^{-1} \geq 0$. This result then implies that $x_0 = L_0^{-1} d_0 \geq 0$.

Solving the System of Equations. Solving Eq. 13 is the computational core of the process. It requires the solution to a large, sparse system of symmetric equations where the number of nonzero entries in L will equal 2m.

The following code in a graphics processing unit is preferred to implement the thresholding step together with the calculation of the isoperimetric ratio.

```
float4 psIsoRatio(PosTex5 v) : COLOR
{
    // sample solution, y-component is X
    float center = tex2D(sam0, v.TexCoordsC).y;
    float4 neighbors;
    neighbors.x = tex2D(sam0, v.TexCoordsU).y;
    neighbors.y = tex2D(sam0, v.TexCoordsL).y;
    neighbors.z = tex2D(sam0, v.TexCoordsR).y;
    neighbors.w = tex2D(sam0, v.TexCoordsD).y;
```

```
    // sample L matrix
    float4 L = tex2D(sam1, v.TexCoordsC);
    // test solution values against testthreshold
    float2 node = step(testthreshold.xy, center);
    float4 tn0 = step(testthreshold.x, neighbors);
    float4 tn1 = step(testthreshold.y, neighbors);
    float2 edgecut;
    edgecut.x = node.x * dot(L, 1-tn0);
    edgecut.y = node.y * dot(L, 1-tn1);
    // output 1 if pixel is in segmentation
    node = 1 - node;
    return float4(edgecut.x, node.x, edgecut.y, node.y);
}
```

A difference is that the isoperimetric method requires the solution to a sparse linear system rather than the solution to the eigenvector problem required by spectral methods of image segmentation.

Methods of image segmentation. It is not clear, a priori, how to impose a graph structure on an image. Since pixels define the discrete input, a simple choice for nodes is the pixels themselves. Traditional neighborhood connectivity employs a 4-connected or 8-connected topology. Another approach, taken by Shi and Malik, is to use a fully connected neighborhood within a parameterized radius of each node. We chose to use a minimal 4-connected topology since the matrix L becomes less sparse as more edges are added to the graph, and a graph with more edges requires more time to solve (13). Edge weights were generated from intensity values in the case of a grayscale image or from RGB color values in the case of a color image.

The isoperimetric algorithm is controlled by only two parameters: the parameter $\beta$ of Eq 18 and the stop parameter used to end the recursion. The first parameter affects how sensitive the algorithm is to changes in feature space (e.g., RGB, intensity), while the stop parameter determines the maximum acceptable isoperimetric ratio a partition must generate in order to accept it and continue the recursion.

The following references are descriptive of background information and are hereby incorporated by reference: (1) Leo Grady and Eric L. Schwartz, "Isoperimetric Graph Partitioning for Data Clustering and Image Segmentation", submitted to IEEE PAMI; (2) Anthony Sherbondy, Mike Houston, and Sandy Napel. Fast Volume Segmentation With Simultaneous Visualization Using Programmable Graphics Hardware. IEEE Visualization 2003, Seattle, Wash., USA, 19-24 October 2003. Sponsors: IEEE Comput. Soc. Tech. Comm. on Visualisation and Graphics. In: p. 171-6, 2003; (3) Ruigang Yang and Greg Welch. Fast image segmentation and smoothing using commodity graphics hardware. Journal of Graphics Tools, 7(4):91-100, 2002; (4) A. E. Lefohn, J. E. Cates, R. T. Whitaker, "Interactive, GPU-Based Level Sets for 3D Segmentation," Medical Image Computing and Computer Assisted Intervention (Miccai), pp. 564-572, 2003; (5) A. E. Lefohn, J. M. Kniss, C. D. Hansen, R. T. Whitaker, "Interactive Deformation and Visualization of Level Set Surfaces Using Graphics Hardware," IEEE Visualization, pp. 7582, 2003; (6) Bolz, J.; Farmer, I.; Grinspun, E.; Schrooder, P. Sparse matrix solvers on the GPU: conjugate gradients and multigrid. ACM Transactions on Graphics; Volume 22, Issue 3 (July 2003); Special issue: Proceedings of ACM SIGGRAPH 2003; Pages: 917-924; (7) Jens Krüger; Rüdiger Westermann; Linear algebra operators for GPU implementation of numerical algorithms; ACM Transactions on Graphics; Volume 22, Issue 3 (July 2003); Special issue: Proceedings of ACM SIGGRAPH 2003; p. 908-916; (8) Ádám Moravánszk; Dense Matrix Algebra on the GPU, in ShaderX2: Shader Programming Tips & Tricks with DirectX 9; Engel, W.; Wordware Publishing; 2003; p. 352-381. 352 (29); (9) Chris J. Thompson; Sahngyun Hahn; Mark Oskin. Using modern graphics architectures for general-purpose computing: a framework and analysis; Proceedings of the 35th annual ACM/IEEE international symposium on Microarchitecture; Istanbul, Turkey; 2002; Pages: 306-317; (10) S. Aharon and L. Grady, "GPU accelerated multi-label image segmentation (MLS)", 2004; and (11) W. H. Press, S. A. Teukolsky, W. T. Vettenling, B. P. Flannery. Numerical Recipes in C, Second Edition, Cambridge University Press.

Further, all other publications mentioned in this specification not included in this list are hereby incorporated by reference.

Figure 4:
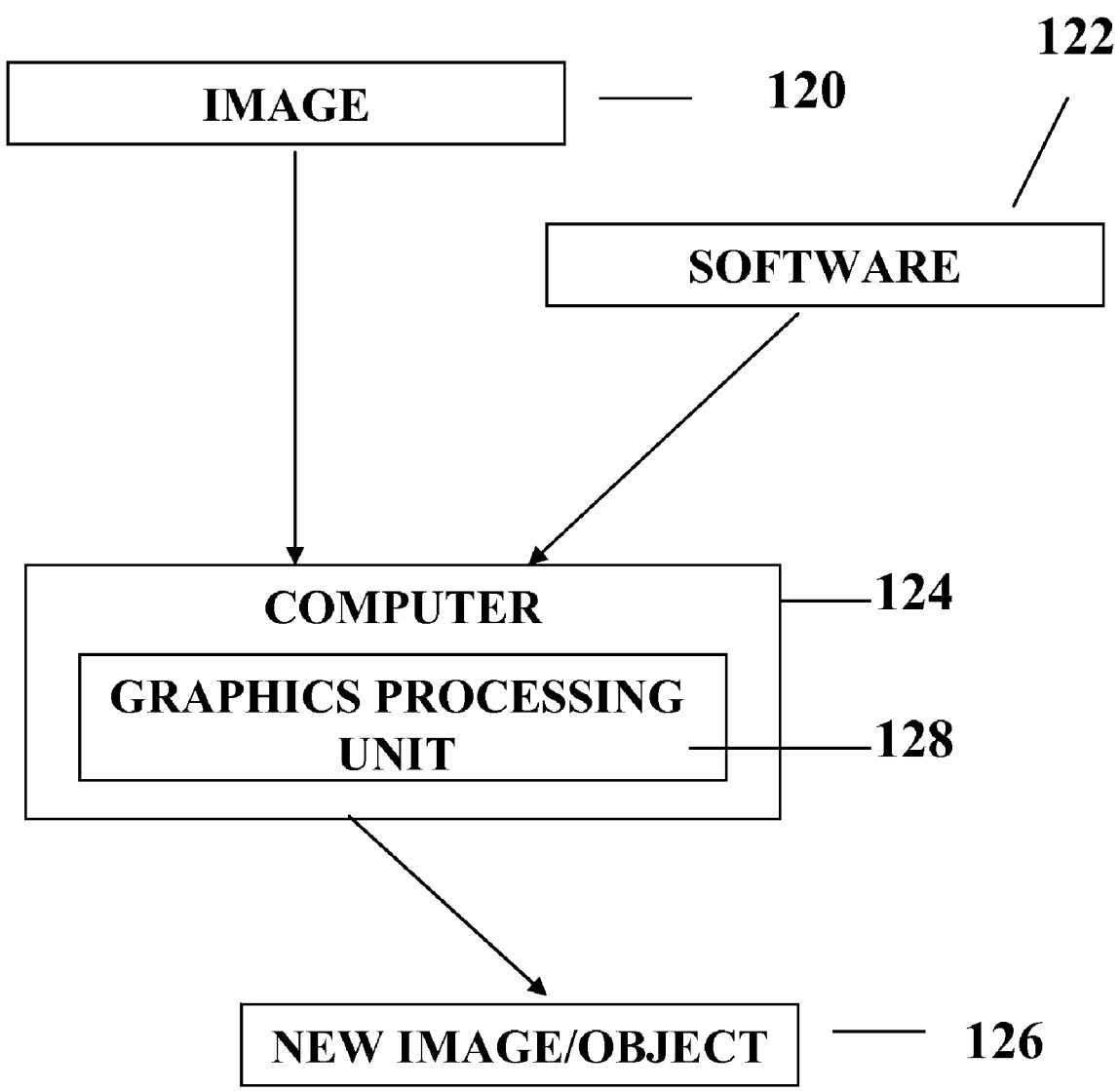
FIG. 4 illustrates a system in accordance with a further aspect of the present invention.

FIG. 4 illustrates a system for implementing the present invention in accordance with one aspect of the present invention. An image 120 is loaded into a computer 124 including a graphics processing unit (GPU)128. The computer 124 may be any type of processing component, including but not limited to, a personal computer or a workstation. Application software 122 is loaded into the computer 124. The application software implements the previously described steps on the graphics processing unit (GPU) 128 of the computer 124, including the steps illustrated in FIGS. 2 and 3. The computer 124 and the software 122 output a new image or the segmented object 126 which is created using the previously described steps. The computer 124 and the application software 122 can perform further processing on the new image or the segmented object 126, including all standard image processing procedures or further segmentation of objects.

While the specification has primarily described the invention with respect to pixels, it is also applicable to sets of image data having voxels, or three dimensions of data. Thus, the word pixel can also refer to voxel. The use of the word node shall be understood to refer to either pixel or voxel.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A system for segmenting an object in an image, the object being identified by one or more selected pixels located within the object, comprising:
    a graphics processing unit; and
    software loaded on the graphics processing unit, the software being operated to:
        (a) create from the image a weighted graph with image pixels being graph nodes;
        (b) determine weights for all edges in the graph of neighboring pixels for the image;
        (c) build a Laplacian matrix L with the weights;
        (d) determine a vector d having values associated with a pixel equal to a sum of the weights of the neighbors of that pixel;
        (e) eliminate the row and column corresponding to the one or more selected pixels from the Laplacian matrix L and the vector d to determine $L_0$ and $d_0$;
        (f) solve x in the equation $L_0 x = d_0$;
        (g) threshold the potentials x to determine a family of segmentations and select one of the segmentations with a minimum isoperimetric ratio described by $$h_G = \min_x (x^T L x)/x^T d$$

as the object; and
        (h) segment the object from the image.

2. The system as claimed in claim 1. wherein the edge weights are a function of the difference between a value associated with a first pixel and a value associated with a second pixel.

3. The system as claimed in claim 2, wherein the edge weights are equal to $w_{ij} = \exp(-\beta \|C_i - C_j\|)^2$ where $w_{ij}$ represents the weight between nodes $v_i$ and $V_j$, $\beta$ is a free parameter, $C_i$ is the vector of color values at node $v_i$ and $C_j$ is the vector of color values at node $v_j$.

4. The system as claimed in claim 1, wherein a golden section search algorithm is used to find the object from a subset of the family of segmentations.

5. The system as claimed in claim 1, wherein the one or more selected pixels are input into a Z buffer in the graphics processing unit such that the one or more selected pixels are excluded from processing.

6. A method of segmenting an object in an image, the object being identified by one or more selected pixels located within the object, comprising:
    creating from the image a graph with image pixels being graph nodes;
    determining weights for all edges in the graph of neighboring pixels for the image;
    building a Laplacian matrix L with the weights;
    determining a vector d having values associated with a pixel equal to a sum of the weights of the neighbors of that pixel;
    eliminating the row and column corresponding to the one or more selected pixels from the Laplacian matrix L and the vector d to determine $L_0$ and $d_0$;
    solving x in the equation $L_0 x = d_0$; and
    thresholding the potentials x to determine a family of segmentations and select one of the segmentations having a minimum isoperimetric ratio described by $$h_G = \min_x (x^T L x)/x^T d$$

as the object; and
    segmenting the object from the image;
    wherein the steps are performed in a graphics processing unit.

7. The method as claimed in claim 6, wherein the edge weights are a function of the difference between a value associated with a first pixel and a value associated with a second pixel.

8. The method as claimed in claim 7, wherein the edge weights are equal to $w_{ij} = \exp(-\beta \|C_i - C_j\|)^2$ where $w_{ij}$ represents the weight between nodes $v_i$ and $v_j$, $\beta$ is a free parameter, $C_i$ is the vector of color values at node $v_i$ and $C_j$ is the vector of color values at node $v_j$.

9. The method as claimed in claim 6, wherein a golden section search algorithm is used to find the object from a subset of the family of segmentations.

10. The method as claimed in claim 6, wherein the one or more selected pixels are input into a Z buffer in the graphics processing unit such that the one or more selected pixels are excluded from processing.

11. A system for segmenting an object in an image, the object being identified by one or more selected pixels located within the object, comprising:
- a graphics processing unit; and
- software loaded on the graphics processing unit, the software being operated to:
  - (a) identify a plurality of possible objects, wherein each possible object includes the one or more selected pixels;
  - (b) create a weighted graph having the one or more selected pixels as nodes, for each of the plurality of possible objects that include the one or more selected pixels;
  - (c) determine an isoperimetric ratio described by $(x^T L x)/x^T d$ of the weighted graph associated with a possible object; wherein L is a Laplacian matrix defined with edge weights, d is vector with each element corresponding to a pixel and having value equal to a sum of the edge weights of the neighbors of that pixel, and x is a given indication vector that takes a binary value at each node; and
  - (d) select the object from the plurality of possible objects in accordance with the isoperimetric ratio.

12. The system as claimed in claim 11, wherein an edge weight of the weighted graph is a function of a value associated with a first pixel and a value associated with a second pixel.

13. The system as claimed in claim 12, wherein the edge weights are equal to $w_{ij}=\exp(-\beta(I_i-I_j)^2)$ where $\beta$ is a constant and I is an intensity value.

14. The system as claimed in claim 11, wherein a golden section search algorithm is used to determine a subset of a family of segmentations to be considered.

15. The system as claimed in claim 11, wherein the one or more selected pixels are input into a Z buffer in the graphics processing unit such that the one or more selected pixels are excluded from processing.

16. A method of segmenting an object in an image, the object being identified by one or more selected pixels located within the object, comprising:
- identifying a plurality of possible objects, wherein each possible object includes the one or more selected pixels;
- creating a weighted graph having the one or more selected pixels as nodes for each of the plurality of possible objects that include the one or more selected pixels;
- determining an isoperimetric ratio described by $(x^T L x)/x^T d$ of the weighted graph associated with a possible object; wherein L is a Laplacian matrix defined with edge weights, d is vector with each element corresponding to a pixel and having value equal to a sum of the edge weights of the neighbors of that pixel, and x is a given indication vector that takes a binary value at each node; and
- selecting the object from the plurality of possible objects in accordance with the isoperimetric ratio,
- wherein the steps are performed in a graphics processing unit.

17. The method as claimed in claim 16, wherein an edge weight of the weighted graph is a function of a value associated with a first pixel and a value associated with a second pixel.

18. The method as claimed in claim 17, wherein the edge weights are equal to $w_{ij}=\exp(-\beta(I_i-I_j)^2)$ where $\beta$ is a constant and I is an intensity value.

19. The method as claimed in claim 16, wherein a golden section search algorithm is used to determine a subset of a family of segmentations to be considered.

20. The method as claimed in claim 16, wherein the one or more selected pixels are input into a Z buffer in the graphics processing unit such that the one or more selected pixels are excluded from processing.

* * * * *